US012560989B2

(12) United States Patent
Yu et al.

(10) Patent No.: US 12,560,989 B2
(45) Date of Patent: Feb. 24, 2026

(54) SYSTEM ON CHIP CONTROLLING CONNECTION OF PROCESSING UNIT TO EXTERNAL CAPACITOR TO REDUCE VOLTAGE DROOP AND ELECTRONIC SYSTEM INCLUDING THE SAME

(71) Applicant: SAMSUNG ELECTRONICS CO., LTD., Suwon-si (KR)

(72) Inventors: Bongwee Yu, Anyang-si (KR); Iksu Lee, Yongin-si (KR); Jaegon Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 961 days.

(21) Appl. No.: 17/669,049

(22) Filed: Feb. 10, 2022

(65) Prior Publication Data

US 2022/0293514 A1 Sep. 15, 2022

(30) Foreign Application Priority Data

Mar. 11, 2021 (KR) ........................ 10-2021-0031751

(51) Int. Cl.
| *G06F 1/26* | (2006.01) |
| *G06F 1/3287* | (2019.01) |
| *G06F 15/78* | (2006.01) |

(52) U.S. Cl.
CPC ................ *G06F 1/263* (2013.01); *G06F 1/26* (2013.01); *G06F 1/3287* (2013.01); *G06F 15/7807* (2013.01)

(58) Field of Classification Search
None
See application file for complete search history.

(56) References Cited

U.S. PATENT DOCUMENTS

| 6,937,458 | B2 | 8/2005 | Seshan |
| 8,193,800 | B2 | 6/2012 | Zhou |
| 10,145,868 | B2 | 12/2018 | Chong et al. |
| 10,749,513 | B2 | 8/2020 | Ihs |
| 10,756,622 | B2 | 8/2020 | Dabral et al. |
| 10,812,085 | B2 | 10/2020 | Chandrasekar et al. |
| 2011/0215654 | A1* | 9/2011 | Kumar .................... H02M 3/06 |
| | | | 307/109 |
| 2015/0006916 | A1* | 1/2015 | Knoth ........................ H02J 1/02 |
| | | | 713/300 |
| 2015/0293551 | A1* | 10/2015 | Coutts ........................ G05F 1/00 |
| | | | 327/538 |
| 2015/0370316 | A1 | 12/2015 | Park et al. |
| 2017/0207697 | A1* | 7/2017 | Heo ........................ G06F 1/3243 |
| 2018/0059761 | A1* | 3/2018 | An ........................ G06F 13/4068 |
| 2018/0308527 | A1* | 10/2018 | Narayanan ............ G06F 3/0619 |

* cited by examiner

*Primary Examiner* — Danny Chan
(74) *Attorney, Agent, or Firm* — Sughrue Mion, PLLC

(57) ABSTRACT

A system on chip includes a processing unit including the first processing circuit and a second processing circuit, a connection circuit configured to form a path connecting one of the first processing circuit and the second processing circuit to an external capacitor, and a controller configured to control the connection circuit based on a state of at least one of the first processing circuit and the second processing circuit.

14 Claims, 20 Drawing Sheets

FIG. 1B

START

CHECK STATES OF PLURALITY OF
PROCESSING CIRCUITS — S100a

SELECT PROCESSING CIRCUIT TO BE CONNECTED TO
EXTERNAL CAPACITOR BASED ON CHECK RESULT — S110a

CONNECT SELECTED PROCESSING CIRCUIT
TO EXTERNAL CAPACITOR — S120a

END

START

MONITOR DROOPS OF SUPPLY VOLTAGES OF PLURALITY OF PROCESSING CIRCUITS —— S200a

COMPARE DROOP DEGREES CORRESPONDING TO PLURALITY OF PROCESSING CIRCUITS —— S210a

SELECT PROCESSING CIRCUIT TO BE CONNECTED TO EXTERNAL CAPACITOR BASED ON COMPARISON RESULT —— S220a

CONNECT SELECTED PROCESSING CIRCUIT TO EXTERNAL CAPACITOR —— S230a

END

START

MONITOR LOADS OF PLURALITY OF
PROCESSING CIRCUITS — S200b

COMPARE LOADS CORRESPONDING TO
PLURALITY OF PROCESSING CIRCUITS — S210b

SELECT PROCESSING CIRCUIT TO BE CONNECTED TO
EXTERNAL CAPACITOR BASED ON COMPARISON RESULT — S220b

CONNECT SELECTED PROCESSING CIRCUIT TO
EXTERNAL CAPACITOR — S230b

END

SYSTEM ON CHIP CONTROLLING CONNECTION OF PROCESSING UNIT TO EXTERNAL CAPACITOR TO REDUCE VOLTAGE DROOP AND ELECTRONIC SYSTEM INCLUDING THE SAME

CROSS-REFERENCE TO RELATED APPLICATION

This application is based on and claims priority under 35 U.S.C. § 119 to Korean Patent Application No. 10-2021-0031751, filed on Mar. 11, 2021, in the Korean Intellectual Property Office, the disclosure of which is incorporated by reference herein in its entirety.

BACKGROUND

Embodiments of the disclosure are related to systems on chip, and particularly, to systems on chip for effectively controlling voltage droops and electronic systems including the same.

A voltage droop may include a loss in output voltage from a circuit as the circuit drives a load, providing demanded load current. Droop may be due to, for example, some amount of resistance between a voltage source and a load.

Supply voltages of high-performance processing circuits (functional circuits or semiconductor circuits) included in a system on chip (SoC) fluctuate depending on an operation environment and a level of an operation to be performed, and the processing circuits may receive a capacitance from an external capacitor to improve a droop phenomenon in which the supply voltages drop significantly and generally.

In addition, although a need for the external capacitor to improve the droop phenomenon occurring in the processing circuits continues, a design area of the system on chip is reduced due to process miniaturization, and thus, a region where the external capacitor is arranged is limited.

SUMMARY

Example embodiments provide a system on chip that controls a connection between processing circuits in the system on chip and an external capacitor to efficiently use the external capacitor, and an electronic system including the system on chip.

According to an example embodiment, a system on chip includes a processing unit including a first processing circuit and a second processing circuit, a connection circuit configured to form a path connecting one of the first processing circuit and the second processing circuit to an external capacitor, and a controller configured to control the connection circuit based on a state of at least one of the first processing circuit and the second processing circuit.

According to an example embodiment, an electronic system includes a system on chip including a plurality of processing circuits, a plurality of dedicated capacitors respectively assigned to the plurality of processing circuits, and a sharing capacitor shared with at least two processing circuits of the plurality of processing circuits, wherein the system on chip includes a connection circuit configured to form a path connecting the at least two processing circuits to the sharing capacitor, and a controller configured to control the connection circuit based on states of the at least two processing circuits.

According to an example embodiment, a system on chip includes a processing unit including a first processing circuit and a second processing circuit to which external dedicated capacitors are respectively connected, a connection circuit configured to form a path providing an additional capacitance from an external capacitor to at least one of the first processing circuit and the second processing circuit, and a controller configured to the connection circuit by considering an occurrence of a droop in supply voltages respectively applied to the first processing circuit and the second processing circuit.

BRIEF DESCRIPTION OF THE DRAWINGS

Embodiments of the disclosure will be understood from the following detailed description taken in conjunction with the accompanying drawings in which:

FIGS. 1A and 1B are block diagrams illustrating electronic systems according to example embodiments;

DETAILED DESCRIPTION

Hereinafter, example embodiments will be described in detail with reference to the accompanying drawings.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1A:
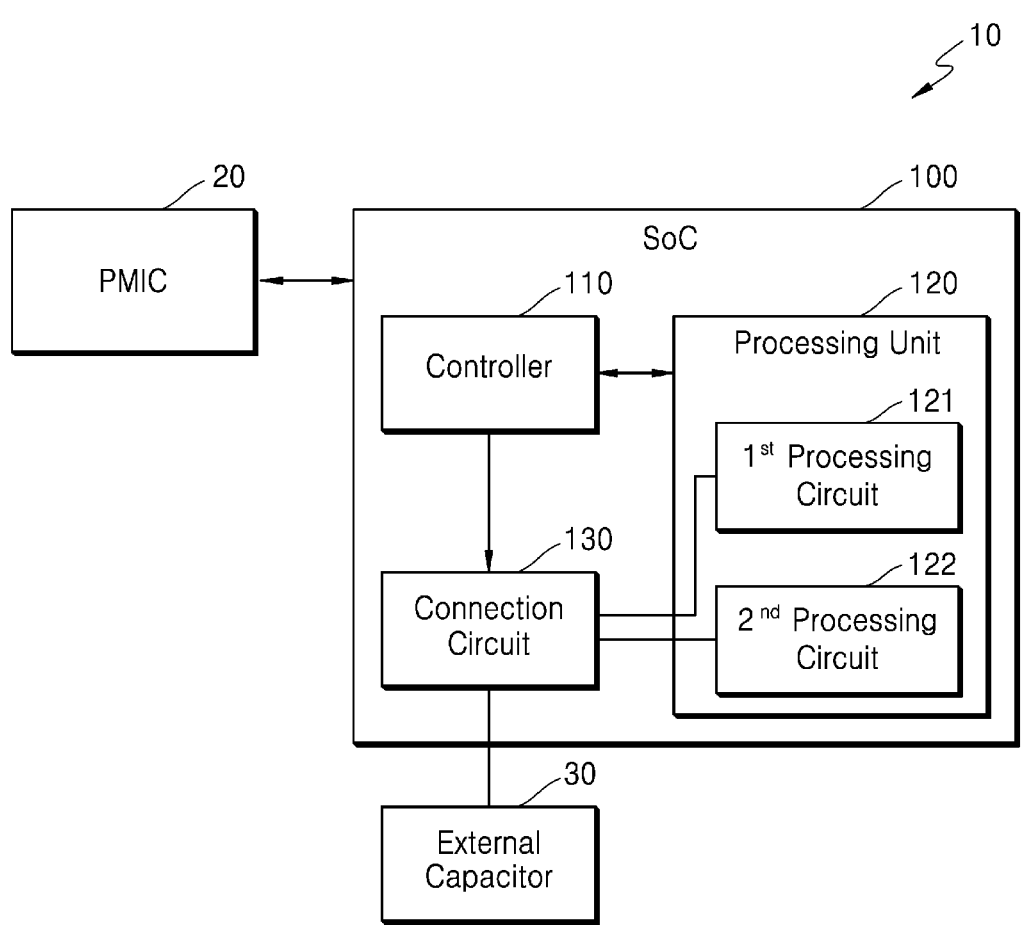
Figure 1B:
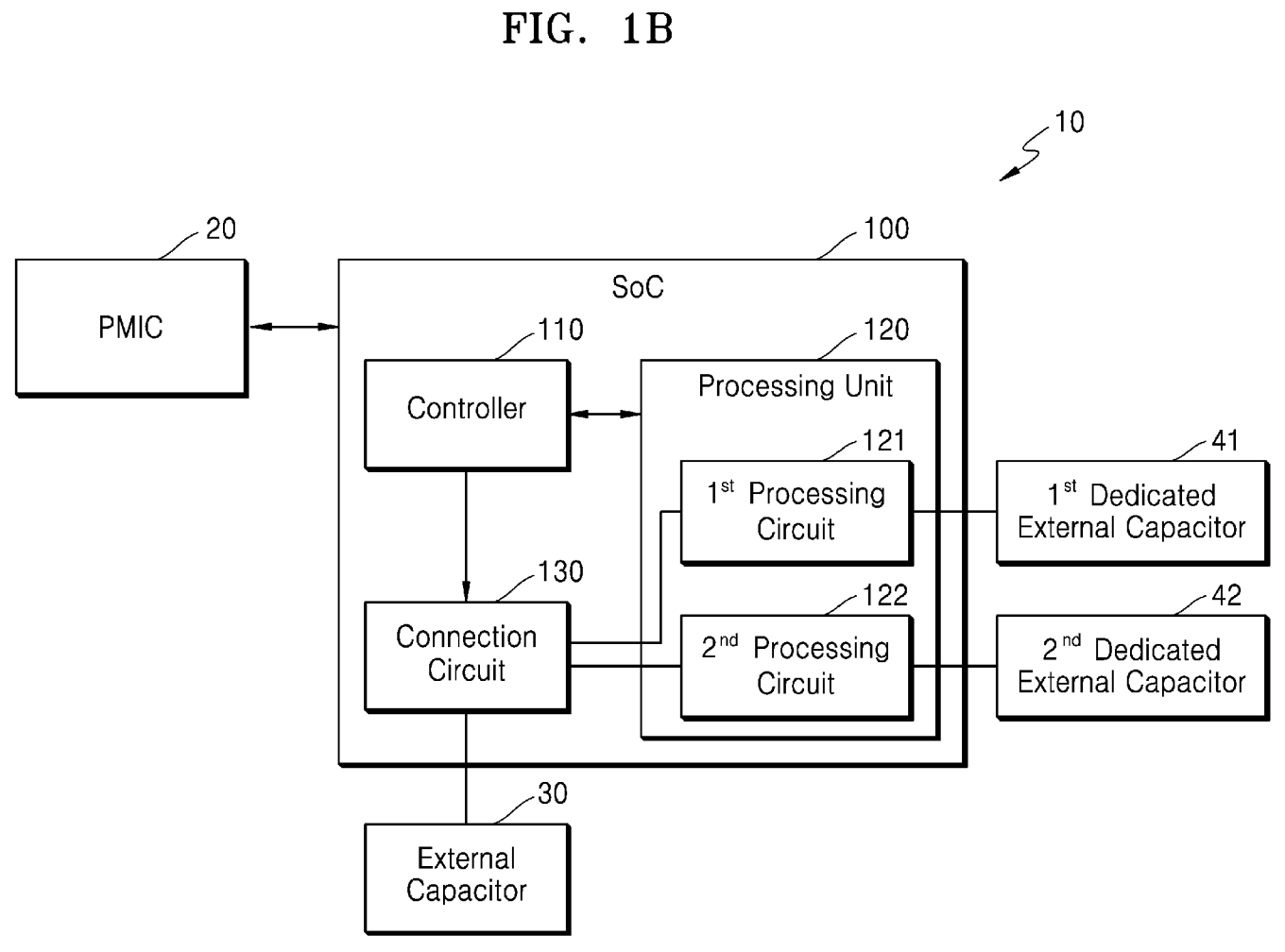

FIGS. 1A and 1B are block diagrams illustrating an electronic system 10 according to an example embodiment.

Referring to FIG. 1A, the electronic system 10 may include a power management integrated circuit (PMIC) 20, an external capacitor 30, and a system on chip (SoC) 100.

In an example embodiment, the electronic system 10 may include various computing devices or mobile devices, such as a mobile phone, a smartphone, a tablet personal computer (PC), a personal digital assistant (PDA), an enterprise digital assistant (EDA), a portable multimedia player (PMP), a digital camera, a music player, a portable game console, a navigation device, a wearable device, an internet of things (IoT) device, an internet of everything (IoE) device, an e-book, a virtual reality (VR) device, and an augmented reality (AR) device.

In an example embodiment, the system on chip 100 may include a controller 110, a processing unit 120, and a connection circuit 130. A processing unit may include a hardware processor, a field programmable gate array (FPGA), an application specific circuit (ASIC), a memory and/or a phase lock loop implemented by a hardware circuit. The processing unit 120 may include a first processing circuit 121 and a second processing circuit 122. In one example, the first processing circuit 121 and the second processing circuit 122 may be defined as one core, and in this case, the processing unit 120 may include a processor such as a central processing unit (CPU) or a graphics processing unit (GPU). In another example, each of the first processing circuit 121 and the second processing circuit 122 may be defined as a cluster including a plurality of cores. Specific examples thereof will be described below with reference to FIGS. 2A and 2B.

The power management integrated circuit 20 may provide a supply voltage of the same level or supply voltages of different levels to the first processing circuit 121 and the second processing circuit 122, respectively. In an example embodiment, the first processing circuit 121 and the second processing circuit 122 may be selectively connected to the external capacitor 30 through the connection circuit 130. That is, the first processing circuit 121 and the second processing circuit 122 may share the external capacitor 30 through the connection circuit 130, and the external capacitor 30 may be referred to as a sharing capacitor. In an example embodiment, the connection circuit 130 may form a path for a connection between the first processing circuit 121 or the second processing circuit 122 and the external capacitor 30. The external capacitor 30 may be connected to at least one of the first processing circuit 121 and the second processing circuit 122 to provide a capacitance. The provided capacitance may mitigate a droop of a supply voltage to the processing circuit connected to the external capacitor 30. FIG. 1A mainly illustrates the first processing circuit 121 and the second processing circuit 122 sharing the external capacitor 30, but this is only an example embodiment, and the embodiments are not limited thereto, and the processing unit 120 may further include processing circuits sharing the external capacitor 30 or not sharing the external capacitor 30. Furthermore, the electronic system 10 may further include more external capacitors.

In an example embodiment, the external capacitor 30 may be arranged at one end or the other end of the system on chip 100 as a land side capacitor or may be stacked on one of layers constituting the system on chip 100 as a die-type capacitor to be connected to the connection circuit 130. In one example, a solder ball may be formed in the external capacitor 30, and the external capacitor 30 may be connected to the connection circuit 130 through the solder ball. In another example, the external capacitor 30 may be connected to the connection circuit 130 through a through silicon via (TSV).

In addition, further referring to FIG. 1B, the electronic system 10 may further include a first dedicated external capacitor 41 and a second dedicated external capacitor 42. The first dedicated external capacitor 41 and the second dedicated external capacitor 42 are respectively connected to the first processing circuit 121 and the second processing circuit 122 to provide a constant capacitance to the first processing circuit 121 and the second processing circuit 122. In an example embodiment, the external capacitor 30 may provide an additional capacitance to at least one of the first processing circuit 121 and the second processing circuit 122.

Referring back to FIG. 1A, in an example embodiment, the controller 110 may control an operation of the connection circuit 130 based on a state of at least one of the first processing circuit 121 and the second processing circuit 122. The state of at least one indicates a degree related to droops of supply voltages applied to the first processing circuit 121 and the second processing circuit 122, and the controller 110 may control the connection circuit 130 such that a capacitance of the external capacitor 30 may be selectively provided to at least one of the first processing circuit 121 and the second processing circuit 122.

In an example embodiment, the controller 110 may control the operation of the connection circuit 130 based on a state regarding a droop degree of a supply voltage applied to each of the first processing circuit 121 and the second processing circuit 122. In one example, the controller 110 may control the connection circuit 130 such that the external capacitor 30 is connected to a processing circuit having a greater droop degree of the supply voltage among the first processing circuit 121 and the second processing circuit 122. The droop degree may be defined as including a frequency of occurrence of the droop and a size of a droop level.

In addition, in an example embodiment, the controller 110 may control the operation of the connection circuit 130 based on a state regarding a load degree of each of the first processing circuit 121 and the second processing circuit 122. The load degree may mean the amount of workload to be processed by the processing circuits, and the controller 110 may directly acquire the load degree from each processing circuit or may check the load degree with the number of commands in a command queue corresponding to each processing circuit. In addition, a processing circuit with a high load degree has a high possibility of droop of a supply voltage due to sudden current consumption when performing a processing operation, and thus, the processing circuit with a high load degree is required to be connected to the external capacitor 30. In one example, the controller 110 may control the connection circuit 130 such that the external capacitor 30 is connected to a processing circuit with a higher load degree between the first processing circuit 121 and the second processing circuit 122.

In addition to being implemented such that the external capacitor 30 is connected to one of the first processing circuit 121 and the second processing circuit 122, a part of the external capacitor 30 may be connected to one of the first processing circuit 121 and the second processing circuit 122, and the other part of the external capacitor 30 may be connected to the other of the first processing circuit 121 and the second processing circuit 122. A specific embodiment thereof will be described below with reference to FIGS. 13A and 13B.

The controller 110 may control a closed loop-dynamic voltage frequency scaling (CL-DVFS) operation for the processing unit 120 in connection with the power management integrated circuit 20. In one example, the controller 110 may monitor temperatures (or a temperature of the processing unit 120), process profiles, and so on of the first processing circuit 121 and the second processing circuit 122 and determine whether or not a voltage optimization (or frequency optimization) is required based on the monitoring results, and then may change levels of supply voltages (or a frequency of a clock signal) applied to the first processing circuit 121 and the second processing circuit 122 through the power management integrated circuit 20 (or a clock management unit). In an example embodiment, the controller 110 may control an operation of the connection circuit 130 to conform to the CL-DVFS operation when controlling the CL-DVFS operation for at least one of the first processing circuit 121 and the second processing circuit 122. Specifically, the controller 110 may control a selective connection between the first processing circuit 121 or the second processing circuit 122 and the external capacitor 30 at a CL-DVFS update time of the first processing circuit 121 or the second processing circuit 122.

In one example, when the controller 110 reduces the level of the supply voltage of the first processing circuit 121, the controller 110 may control the connection circuit 130 such that the external capacitor 30 is connected to the first processing circuit 121. However, this is only an example embodiment, and when the controller 110 increases the level of the supply voltage of the first processing circuit 121, the controller 110 may also control the connection circuit 130 such that the external capacitor 30 is connected to the first processing circuit 121. That is, the controller 110 may control an operation of the connection circuit 130 for mitigating a droop considering the droop of the supply voltage that may be caused by the CL-DVFS operation for the processing circuit.

The system on chip 100 according to an example embodiment may mitigate the droop of the supply voltage caused by selectively connecting the external capacitor 30 to at least one of the first processing circuit 121 and the second processing circuit 122 based on states of the first processing circuit 121 and the second processing circuit 122. In addition, a design area of the electronic system 10 may be efficiently used by reducing the number of required external capacitors through a configuration of the external capacitor 30 shared by the first processing circuit 121 and the second processing circuit 122.

Figure 2A:
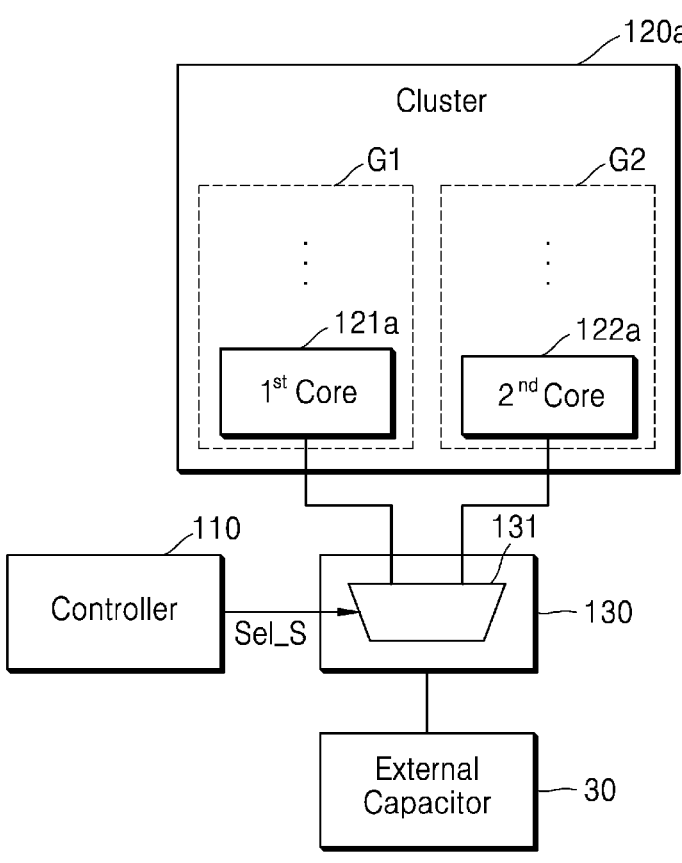
FIGS. 2A and 2B are diagrams illustrating first and second processing circuits of FIG. 1A.

Referring to FIG. 2A, the processing unit 120 of FIG. 1A may be implemented as a cluster 120a, and the cluster 120a may include a first core group G1 and a second core group G2. The first core group G1 may include a plurality of cores including the first core 121a, and the first core 121a may correspond to the first processing circuit 121 of FIG. 1A. The second core group G2 may include a plurality of cores including the second core 122a, and the second core 122a may correspond to the second processing circuit 122 of FIG. 1A. In some embodiments, supportable performances of the first core group G1 and the second core group G2 may be the same as or different from each other. For example, the first core group G1 may include high-performance cores, and the second core group G2 may include low-power cores.

In an example embodiment, the connection circuit 130 may include a multiplexer 131. The multiplexer 131 may selectively connect one of the first core 121a and the second core 122a to the external capacitor 30.

In an example embodiment, the controller 110 may generate a selection signal Sel_S and provide the selection signal Sel_S to the multiplexer 131 based on a state of at least one of the first core 121a and the second core 122a. As described above, the at least one state may include states regarding droop degrees of first and second supply voltages respectively applied to the first core 121a and the second core 122a. In addition, the at least one state may include a state regarding a load degree of each of the first core 121a and the second core 122a. The multiplexer 131 may connect one of the first core 121a and the second core 122a to the external capacitor 30 in response to the selection signal Sel_S.

Figure 2B:
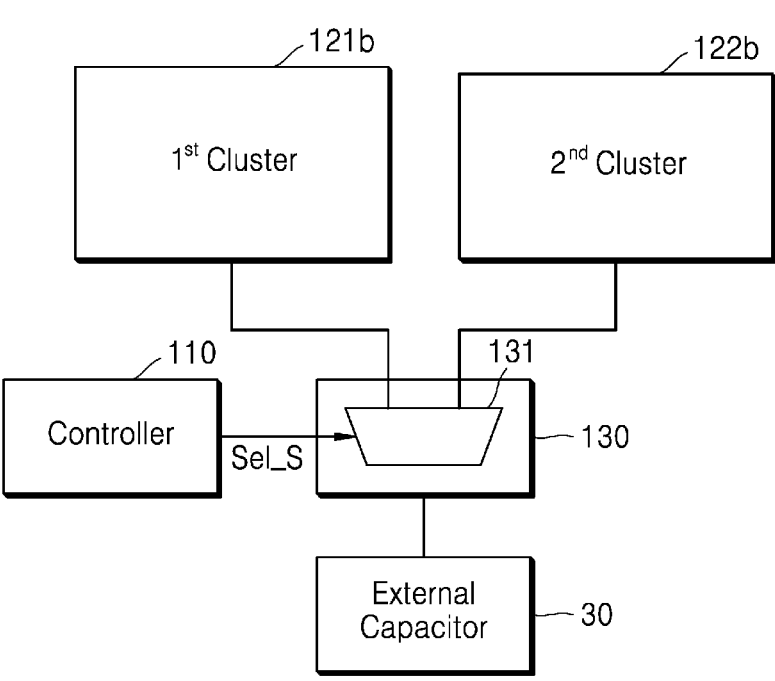

Referring further to FIG. 2B, the first processing circuit 121 of FIG. 1A may be implemented as a first cluster 121b including a plurality of cores, and the second processing circuit 122 may be implemented as a second cluster 122b including a plurality of cores. In some embodiments, supportable performances of the first cluster 121b and the second cluster 122b may be the same as or different from each other. For example, the first cluster 121b may include high-performance cores, and the second cluster 122b may include low-power cores.

In an example embodiment, the connection circuit 130 may include a multiplexer 131. The multiplexer 131 may selectively connect one of the first cluster 121b and the second cluster 122b to the external capacitor 30.

In an example embodiment, the controller 110 may generate the selection signal Sel_S and provide the selection signal Sel_S to the multiplexer 131 based on a state of at least one of the first cluster 121b and the second cluster 122b. The multiplexer 131 may connect one of the first core 121a and the second core 122a to the external capacitor 30 in response to the selection signal Sel_S.

Figure 3:
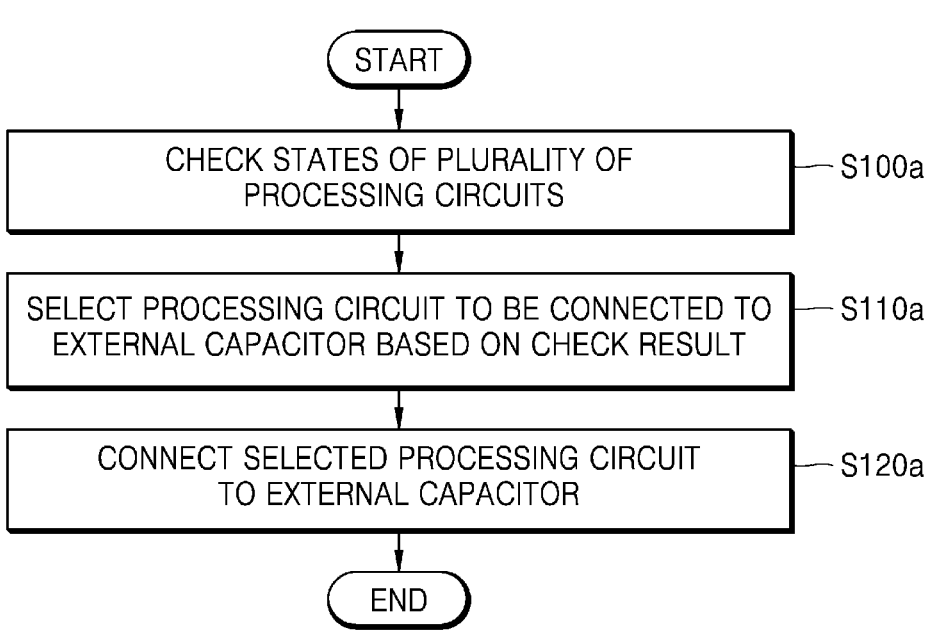
FIG. 3 is a flowchart illustrating a method of operating a system on chip, according to an example embodiment.

FIG. 3 is a flowchart illustrating a method of operating a system on chip, according to an example embodiment.

Referring to FIG. 3, in step S100a, the system on chip may check states of a plurality of processing circuits therein. In one example, the states of the plurality of processing circuits may be indicators indicating degrees related to droops of supply voltages applied to the processing circuits. In step S110a, the system on chip may select a processing circuit connected to an external capacitor arranged outside the system on chip based on the check results. In one example, the system on chip may select a processing circuit in which a droop of a supply voltage occurs or a droop is expected to occur and may connect the selected processing circuit to an external capacitor. In another example, the system on chip may select a processing circuit of which a droop degree of a supply voltage is greater than a droop degree of a supply voltage of the other processing circuit or may select a processing circuit of which a degree of droop to be expected to occur is greater than a degree of droop to be expected to occur in the other processing circuit and may connect the selected processing circuit to the external capacitor. In step S120a, the system on chip may connect the selected processing circuit to the external capacitor. The selected processing circuit may be provided with a capacitance from the external capacitor to mitigate a droop of a supply voltage.

Figure 4:
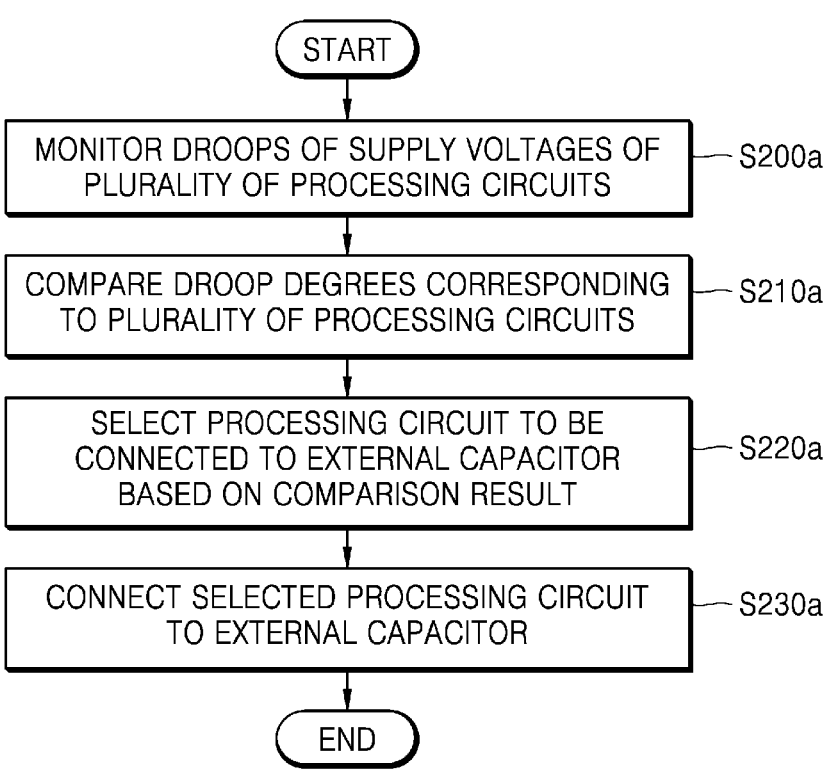
FIG. 4 is a flowchart specifically illustrating the method of operating the system on chip, according to an example embodiment.

FIG. 4 is a flowchart specifically illustrating the method of operating the system on chip according to an example embodiment.

Referring to FIG. 4, in step S200a, the system on chip may monitor droops of supply voltages of a plurality of processing circuits therein. The plurality of processing circuits may be provided with the same level or different levels of supply voltages from a power management integrated circuit, and the system on chip may detect a sudden change in levels of the supply voltages to check a droop. In step S210a, the system on chip may compare droop degrees corresponding to the plurality of processing circuits with each other. In step S220a, the system on chip may select a processing circuit to be connected to an external capacitor based on the comparison result. In step S230a, the system on chip may connect the selected processing circuit to the external capacitor.

Figure 5:
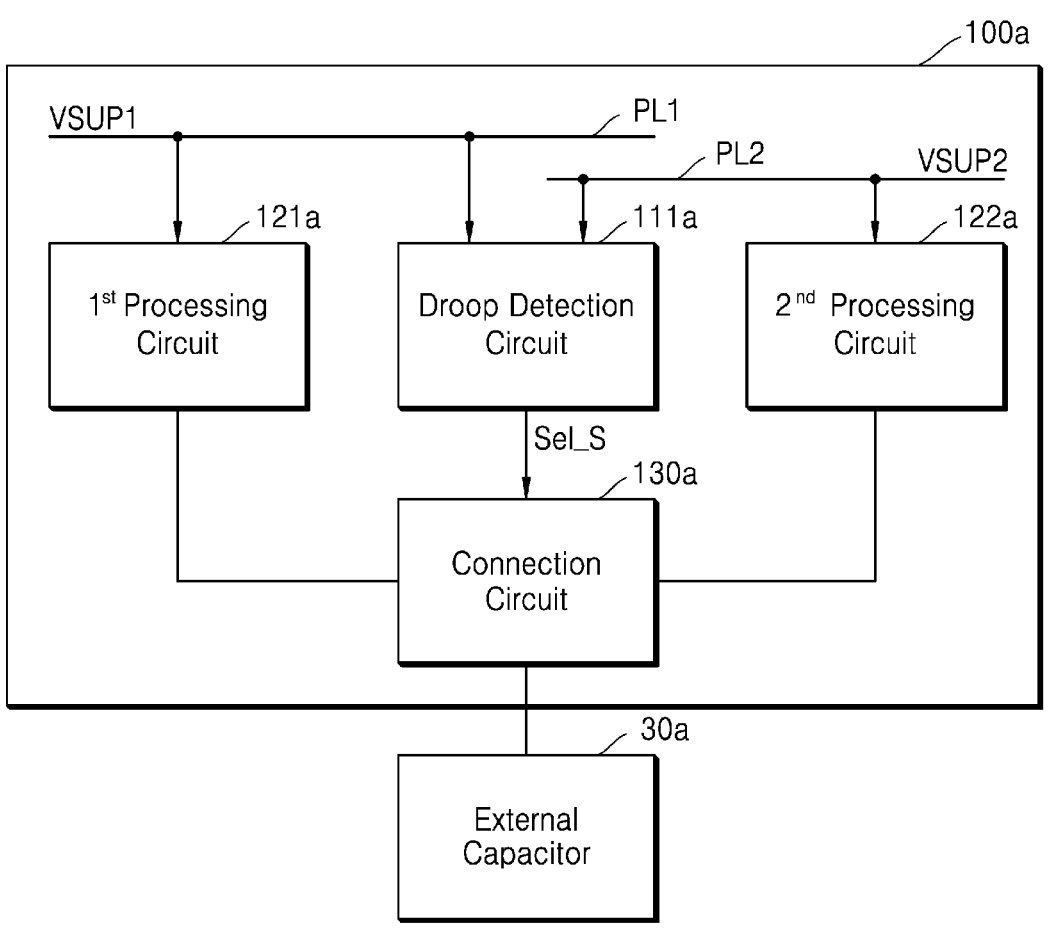
FIG. 5 is a block diagram illustrating a system on chip to which the embodiment of FIG. 4 is applied.

FIG. 5 is a block diagram illustrating a system on chip 100a to which the embodiment of FIG. 4 is applied.

Referring to FIG. 5, the system on chip 100a may include a droop detection circuit 111a, a first processing circuit 121a and a second processing circuit 122a, and a connection circuit 130a. An external capacitor 30a may be connected to the connection circuit 130a. A first supply voltage VSUP1 may be applied to the first processing circuit 121a through a first power line PL1, and a second supply voltage VSUP2 may be applied to the second processing circuit 122a through a second power line PL2. The first power line P1 and the second power line PL2 may be respectively referred to first and second power rails.

In an example embodiment, the droop detection circuit 111a may monitor the first supply voltage VSUP1 and the second supply voltage VSUP2 through the first power line PL1 and the second power line PL2. The droop detection circuit 111a may detect that a droop occurs when the first supply voltage VSUP1 and the second supply voltage VSUP2 drop below a threshold. In addition, the droop detection circuit 111a may recognize how much the first supply voltage VSUP1 and the second supply voltage VSUP2 drop below the threshold, or the frequency of occurrence for a certain time. The droop detection circuit 111a may generate a selection signal Sel_S based on droop-related monitoring results of the first supply voltage VSUP1 and the second supply voltage VSUP2 and provide the selection signal Sel_S to the connection circuit 130a. In one example, the droop detection circuit 111a may control the connection circuit 130a such that a processing circuit having a droop occurred therein or a higher droop degree between the first processing circuit 121a and the second processing circuit 122a is connected to the external capacitor 30a.

In an example embodiment, the connection circuit 130a may connect one of the first processing circuit 121a and the second processing circuit 122a to the external capacitor 30a in response to the selection signal Sel_S. According to this, the connection circuit 130a may mitigate a droop by providing a capacitance of the external capacitor 30a to a processing circuit having a large droop degree.

Figure 6:
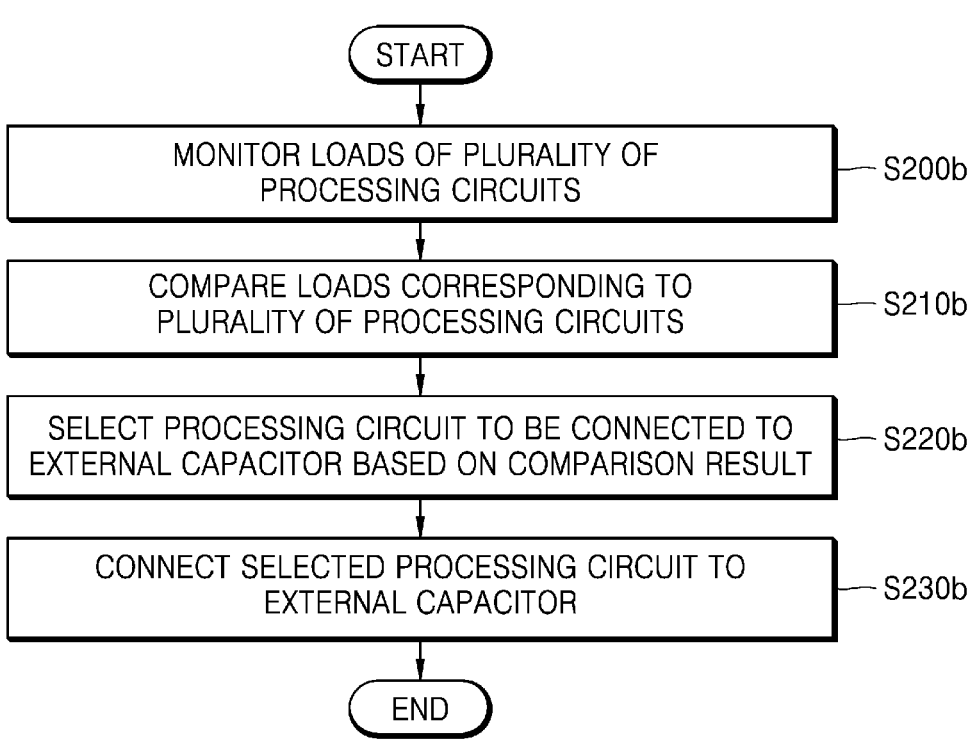
FIG. 6 is a flowchart specifically illustrating a method of operating a system on chip, according to another example embodiment.

FIG. 6 is a flowchart specifically illustrating a method of operating a system on a chip, according to an example embodiment.

Referring to FIG. 6, in step S200b, the system on chip may monitor loads of a plurality of processing circuits therein. The plurality of processing circuits may have the same supportable performance or different supportable performances, and workloads thereof may change in real time. The system on chip may monitor the loads of the plurality of processing circuits in real time to preemptively check a processing circuit in which a droop of a supply voltage is expected to occur. In step S210b, the system on chip may compare loads corresponding to the plurality of processing circuits with each other. In step S220b, the system on chip may select a processing circuit to be connected to an external capacitor based on the comparison result. In step S230b, the system on chip may connect the selected processing circuit to the external capacitor.

Figure 7:
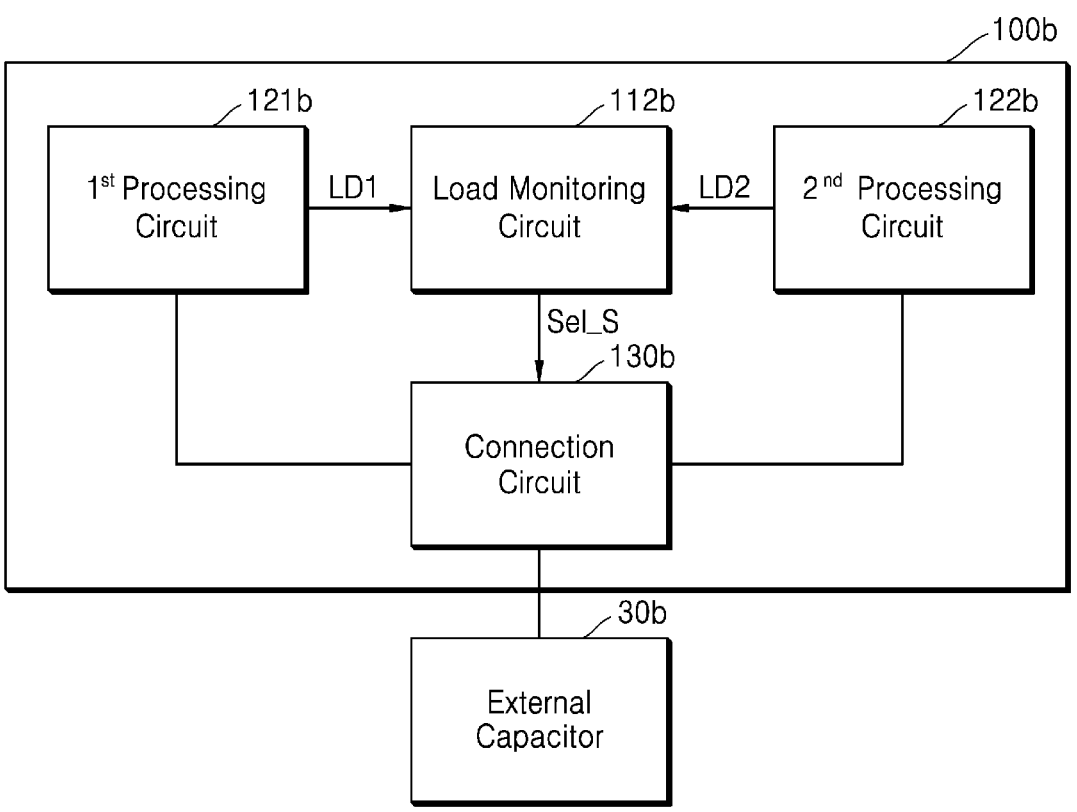
FIG. 7 is a block diagram illustrating a system on chip to which the embodiment of FIG. 6 is applied.

FIG. 7 is a block diagram illustrating a system on chip 100b to which the embodiment of FIG. 6 is applied.

Referring to FIG. 7, the system on chip 100b may include a load monitoring circuit 112b, a first processing circuit 121b and a second processing circuit 122b, and a connection circuit 130b. An external capacitor 30b may be connected to the connection circuit 130b.

In an example embodiment, the load monitoring circuit 112b may acquire a first load degree LD1 and a second load degree LD2 from the first processing circuit 121b and the second processing circuit 122b, respectively. In some embodiments, the load monitoring circuit 112b may check the load degrees based on the number of commands in a command queue corresponding to each of the first processing circuit 121b and the second processing circuit 122b. The load monitoring circuit 112b may check whether or not the first load degree LD1 and the second load degree LD2 exceed a threshold. In addition, the load monitoring circuit 122b may compare the first load degree LD1 with the second load degree LD2. The load monitoring circuit 122b may generate a selection signal Sel_S based on the load monitoring results and provide the selection signal Sel_S to the connection circuit 130b. In one example, the load monitoring circuit 122b may control the connection circuit 130b such that a processing circuit with a load degree exceeding the threshold between the first processing circuit 121b and the second processing circuit 122b or a processing circuit with a higher load degree is connected to the external capacitor 30b.

In an example embodiment, the connection circuit 130b may connect one of the first processing circuit 121b and the second processing circuit 122b to the external capacitor 30b in response to the selection signal Sel_S. According to this, the connection circuit 130b may mitigate a droop by providing a capacitance of the external capacitor 30b to a processing circuit in which a droop of a supply voltage is likely to occur in the future due to a high load degree.

Figure 8A:
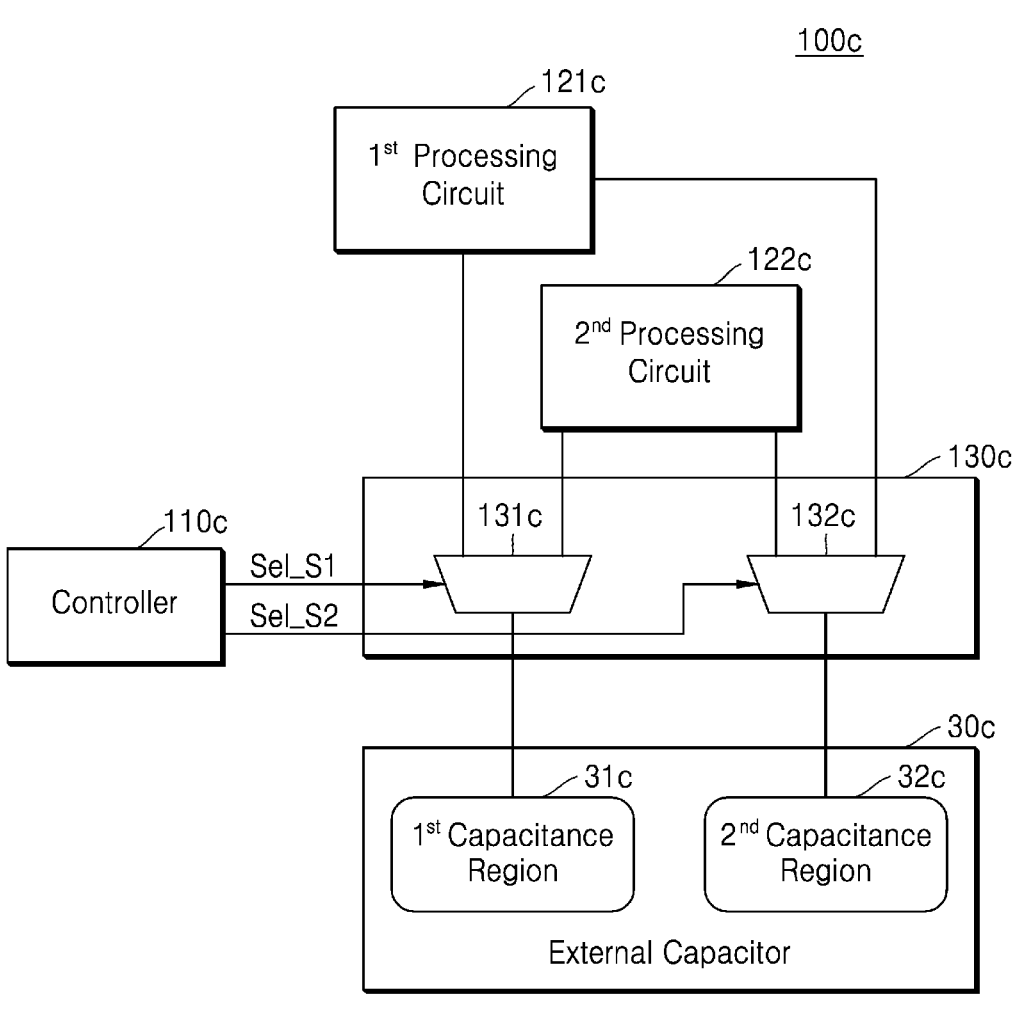
FIGS. 8A and 8B are block diagrams illustrating implementation examples of an external capacitor and a system on chip.
Figure 8B:
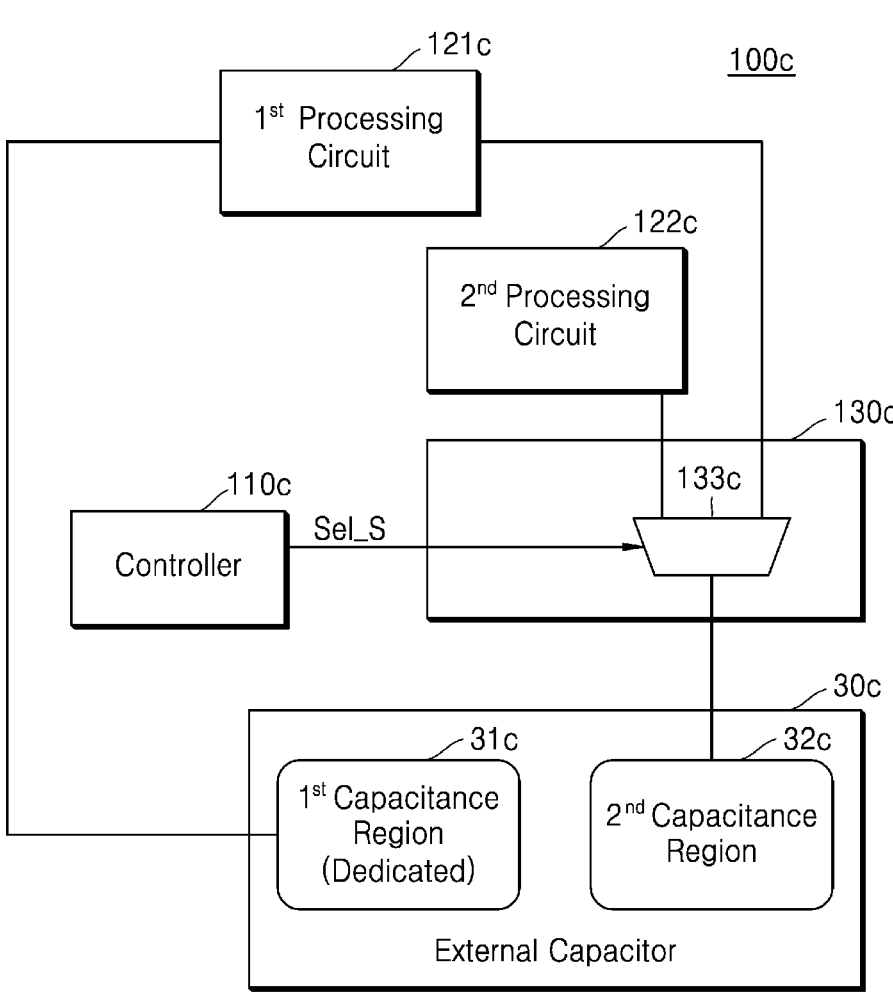

FIGS. 8A and 8B are block diagrams illustrating implementation examples of an external capacitor 30c and a system on chip 100c.

Referring to FIG. 8A, the system on chip 100c may include a first processing circuit 121c and a second processing circuit 122c, a controller 110c, and a connection circuit 130c.

In an example embodiment, the external capacitor 30c may include a first capacitance region 31c and a second capacitance region 32c. The first capacitance region 31c and the second capacitance region 32c may have the same capacitance or different capacitances. In some embodiments, the external capacitor 30c may include more capacitance regions.

In an example embodiment, the external capacitor 30c may include a plurality of capacitor elements, some of the plurality of capacitor elements may constitute the first capacitance region 31c, and the other capacitor elements may constitute the second capacitance region 32c. In addition, the external capacitor 30c may be implemented as a silicon capacitor, and a specific embodiment thereof will be described below with reference to FIG. 14. The external capacitor 30c of FIG. 13B has a terminal connected to the first multiplexer 131c, a terminal connected to the second multiplexer 132c and a ground terminal connected to a ground.

In an example embodiment, the connection circuit 130c may include a first multiplexer 131c and a second multiplexer 132c. The first multiplexer 131c may selectively connect one of the first processing circuit 121c and the second processing circuit 122c to the first capacitance region 31c. The second multiplexer 132c may selectively connect one of the first processing circuit 121*c* and the second processing circuit 122*c* to the second capacitance region 32*c*.

In an example embodiment, the controller 110*c* may generate a first selection signal Sel_S1 based on a state of at least one of the first processing circuit 121*c* and the second processing circuit 122*c* and provide the first selection signal Sel_S1 to the first multiplexer 131*c*. The first multiplexer 131*c* may connect one of the first processing circuit 121*c* and the second processing circuit 122*c* to the first capacitance region 31*c* in response to the first selection signal Sel_S1.

In an example embodiment, the controller 110*c* may generate a second selection signal Sel_S2 based on a state of at least one of the first processing circuit 121*c* and the second processing circuit 122*c* and provide the second selection signal Sel_S2 to the second multiplexer 132*c*. The second multiplexer 132*c* may connect one of the first processing circuit 121*c* and the second processing circuit 122*c* to the second capacitance region 32*c* in response to the second selection signal Sel_S2.

With the above-described configuration, a large capacitance may be provided to one of the first processing circuit 121*c* and the second processing circuit 122*c* by connecting both the first capacitance region 31*c* and the second capacitance region 32*c* of the external capacitor 30*c* to the one, or an intermediate capacitance may be provided thereto by connecting one of the first capacitance region 31*c* and the second capacitance region 32*c* to the one. The controller 110*c* may provide a variable capacitance to the first processing circuit 121*c* or the second processing circuit 122*c* according to a droop degree of a supply voltage of the first processing circuit 121*c* or the second processing circuit 122*c*.

However, the example illustrated in FIG. 8A is only an example embodiment and not limited thereto, and the external capacitor 30*c* may be shared with other processing circuits, and furthermore, the external capacitor 30*c* may include more capacitance regions, and the connection circuit 130*c* may further include multiplexers matching the number of capacitance regions.

Referring further to FIG. 8B, the first capacitance region 31*c* may exclusively provide a capacitance to the first processing circuit 121*c* when compared to FIG. 8A. In an example embodiment, the connection circuit 130*c* may include a multiplexer 133*c*. The multiplexer 133*c* may selectively connect one of the first processing circuit 121*c* and the second processing circuit 122*c* to the second capacitance region 32*c*.

In an example embodiment, the controller 110*c* may generate a selection signal Sel_S based on a state of at least one of the first processing circuit 121*c* and the second processing circuit 122*c* and provide the selection signal Sel_S to the multiplexer 133*c*. The multiplexer 133*c* may connect one of the first processing circuit 121*c* and the second processing circuit 122*c* to the second capacitance region 32*c* in response to the selection signal Sel_S.

With the above-described configuration, one capacitance region of the external capacitor 30*c* may be dedicated to any one of the processing circuits, and the other capacitance region may be shared with the other processing circuits, and thus, the capacitance of the external capacitor 30*c* may be used in a different manner from FIG. 8A.

Figure 9:
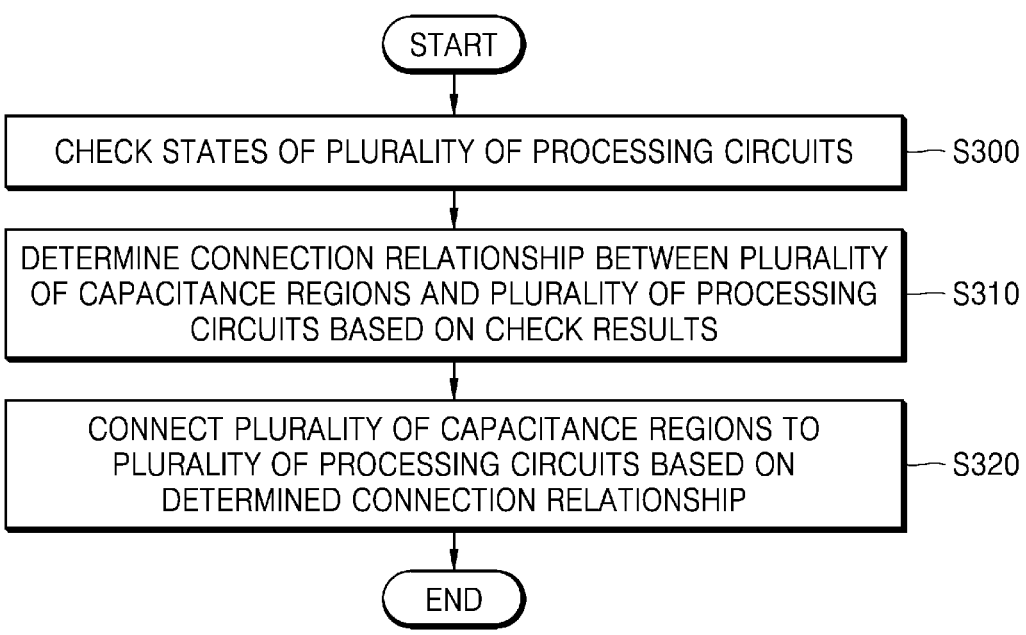
FIG. 9 is a flowchart illustrating a method of operating a system on chip, according to another example embodiment.

FIG. 9 is a flowchart illustrating a method of operating a system on a chip according to an example embodiment.

Referring to FIG. 9, in step S300, the system on chip may check states of a plurality of processing circuits therein. As described above with respect to FIG. 3 and so on, the system on chip may check a degree related to a droop of a supply voltage applied to the plurality of processing circuits. In step S310, the system on chip may determine a connection relationship between a plurality of capacitance regions of an external capacitor and the plurality of processing circuits based on the check results. In step S320, the system on chip may respectively connect the plurality of capacitance regions to the plurality of processing circuits based on the determined connection relationship.

Figure 10:
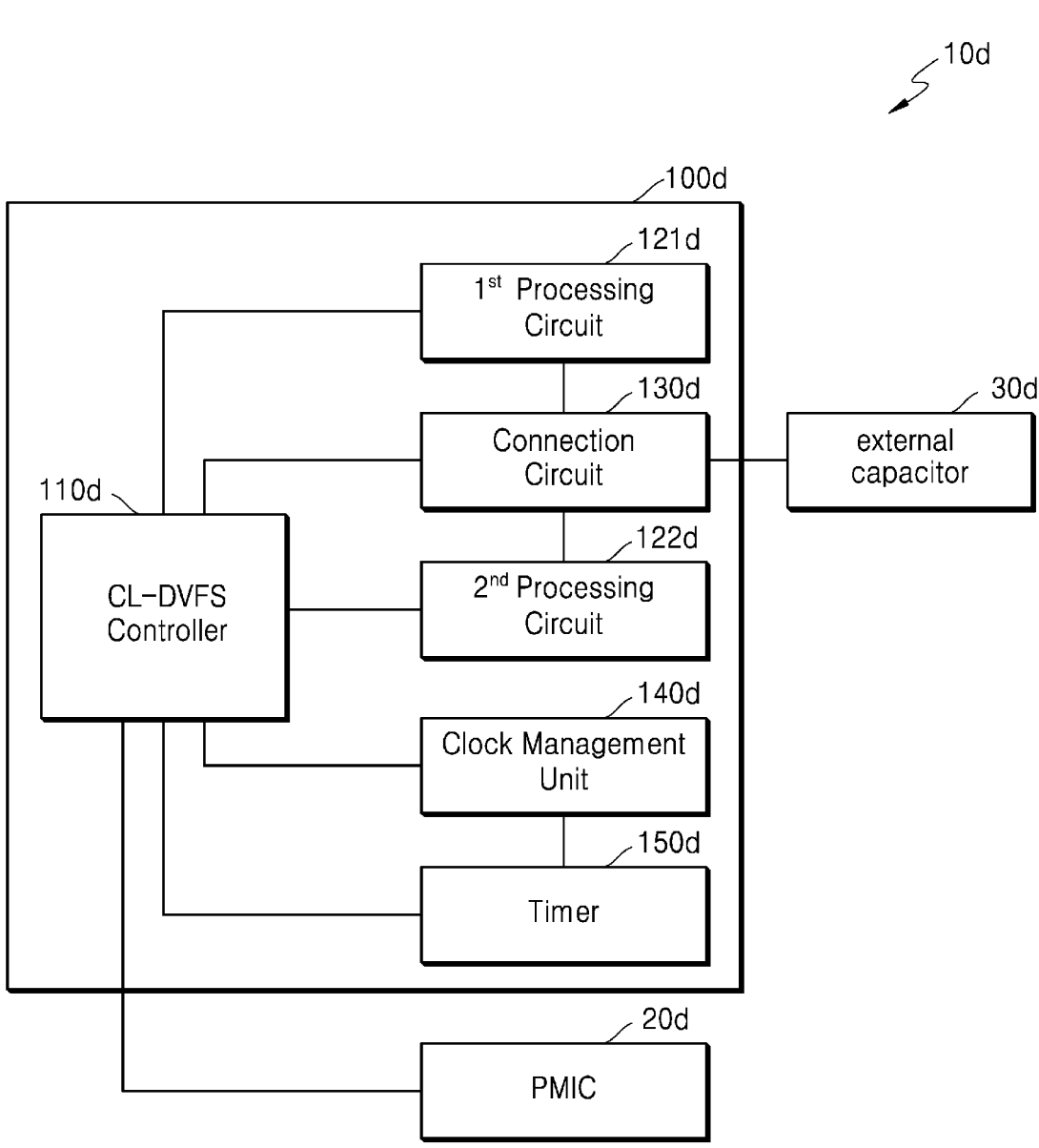
FIG. 10 is a block diagram illustrating a connection operation between an external capacitor and a system on chip performed together with a closed loop-dynamic voltage frequency scaling (CL-DVFS) operation, according to an example embodiment.

FIG. 10 is a block diagram illustrating a connection operation between a system on chip 100*d* and an external capacitor 30*d* performed together with the CL-DVFS operation, according to an example embodiment. Hereinafter, descriptions already given with reference to FIG. 1 is omitted, and the controller 110 of FIG. 1 is assumed to be implemented as a CL-DVFS controller 110*d*. In addition, this is only an example embodiment, and the embodiments are not limited thereto, and the controller 110 of FIG. 1 and the CL-DVFS controller 110*d* may have separate configurations.

Referring to FIG. 10, an electronic system 10*d* may include a power management integrated circuit 20*d*, the external capacitor 30*d*, and the system on chip 100*d*. The system on chip 100*d* may include the CL-DVFS controller 110*d*, a first processing circuit 121*d* and a second processing circuit 122*d*, a connection circuit 130*d*, a clock management unit 140*d*, and a timer 150*d*.

In one example, the first processing circuit 121*d* and the second processing circuit 122*d* may process or execute programs and/or data. In another example, the first processing circuit 121*d* and the second processing circuit 122*d* may convert data into signals suitable for a display device. In another example, the first processing circuit 121*d* may process or execute programs and/or data, and the second processing circuit 122*d* may convert the data into a signal suitable for a display device.

For example, the first processing circuit 121*d* and the second processing circuit 122*d* may operate based on a clock signal output from the clock management unit 140*d*, and frequencies of the clock signals provided to the first processing circuit 121*d* and the second processing circuit 122*d* may be the same as or different from each other.

The clock management unit 140*d* may generate the clock signal. The clock management unit 140*d* may include a clock signal generating device such as a phase lock loop, a delay lock loop, or a crystal oscillator.

The timer 150*d* may output a count value indicating time based on the clock signal output from the clock management unit 140*d*. The count value may be used for the CL-DVFS controller 110*d* to control the CL-DVFS operation in the future.

The power management integrated circuit 20*d* may generate supply voltages required by the first processing circuit 121*d* and the second processing circuit 122*d* to perform operations and respectively provide the supply voltages to the first processing circuit 121*d* and the second processing circuit 122*d*. Levels of supply voltages respectively provided to the first processing circuit 121*d* and the second processing circuit 122*d* may be the same as or different from each other, and the level of the supply voltages may be changed according to a CL-DVFS operation or an open loop (OL)-DVFS operation. In some embodiments, the power management integrated circuit 20*d* may be replaced with a power management unit included in the system on chip 100*d*.

The CL-DVFS controller 110*d* may perform the CL-DVFS operation by controlling the clock management unit 140*d* and the power management integrated circuit 20*d* such that a clock signal with an appropriate frequency and a supply voltage with an appropriate level are applied to at least one of the first processing circuit 121*d* and the second processing circuit 122*d*.

In an example embodiment, the CL-DVFS controller 110*d* may control an operation of the connection circuit 130*d* to conform to the CL-DVFS operation when controlling a CL-DVFS operation for at least one of the first processing circuit 121*d* and the second processing circuit 122*d*. For example, when reducing the level of the supply voltage provided to the first processing circuit 121*d* as a result of the CL-DVFS operation or reducing a frequency of the clock signal, the CL-DVFS controller 110*d* may control the connection circuit 130*d* to establish a first connection relationship between the processing circuit 121*d* conforming thereto and the external capacitor 30*d*. In addition, when increasing the level of the supply voltage provided to the first processing circuit 121*d* as a result of the CL-DVFS operation or increasing the frequency of the clock signal, the CL-DVFS controller 110*d* may control the connection circuit 130*d* to establish a second connection relationship between the processing circuit 121*d* conforming thereto and the external capacitor 30*d*.

In an example embodiment, the CL-DVFS controller 110*d* may control an operation of the connection circuit 130*d* for the purpose of mitigating a droop that may occur due to the CL-DVFS operation for the first processing circuit 121*d* or the second processing circuit 122*d*. As a result, the CL-DVFS controller 110*d* does not need to increase a supply voltage to be higher than a target level or increase a frequency of a clock signal to be higher than a target frequency for the CL-DVFS by considering the occurrence of a droop, and thus, power may be used more efficiently. A specific embodiment thereof will be described below with reference to FIGS. 11 and 12.

Figure 11:
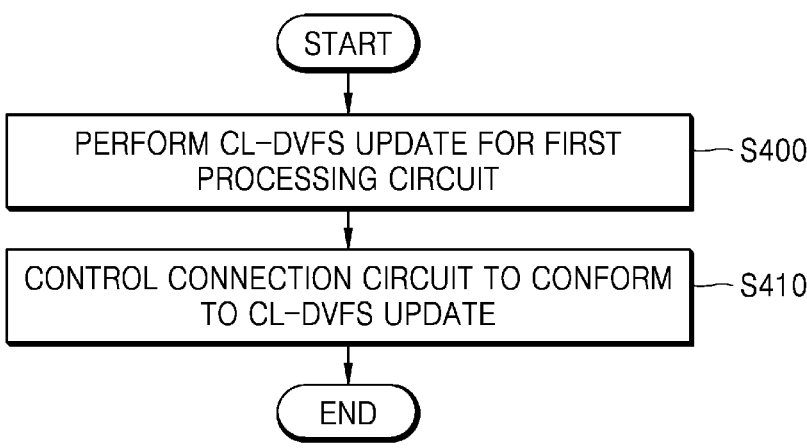
FIG. 11 is a flowchart illustrating a method of operating a system on chip according to another example embodiment.
Figure 12:
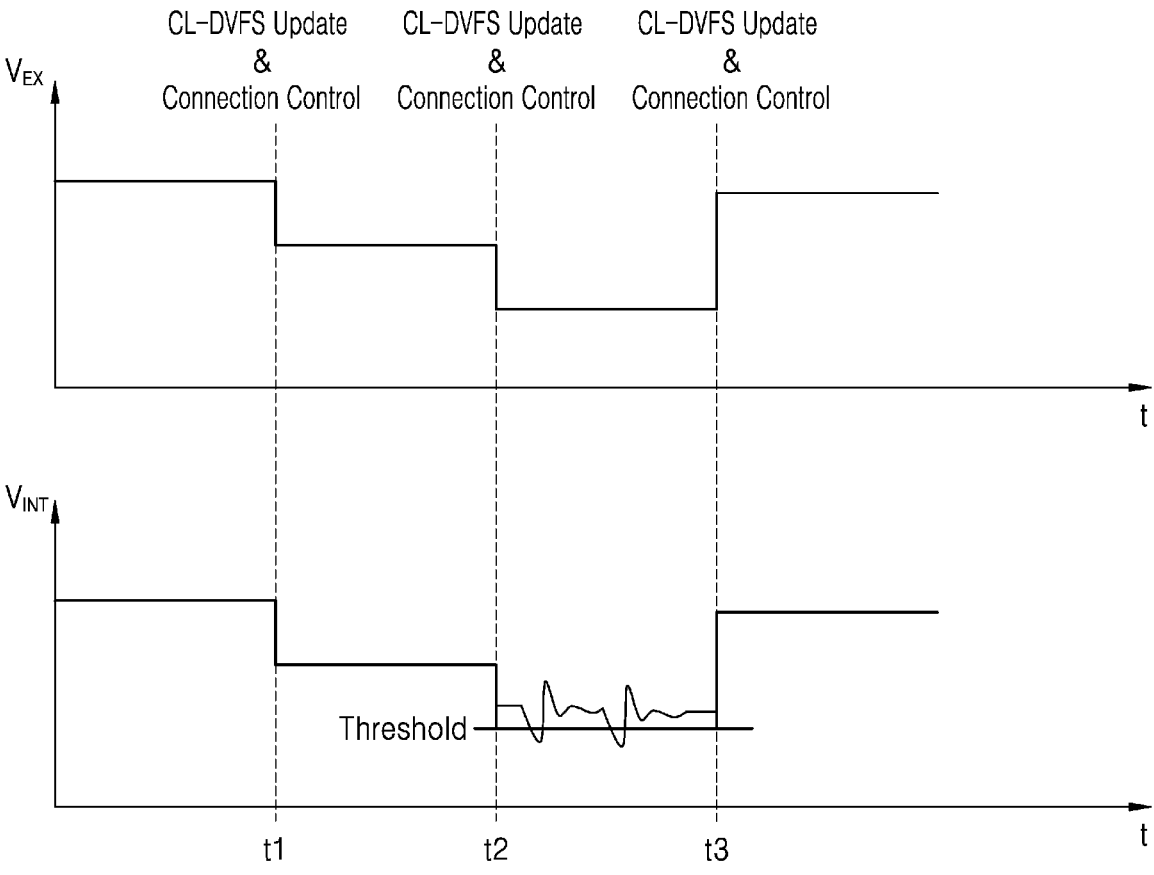
FIG. 12 is a timing diagram illustrating an operation of a system on chip to which the embodiment of FIG. 11 is applied.
Figure 13A:
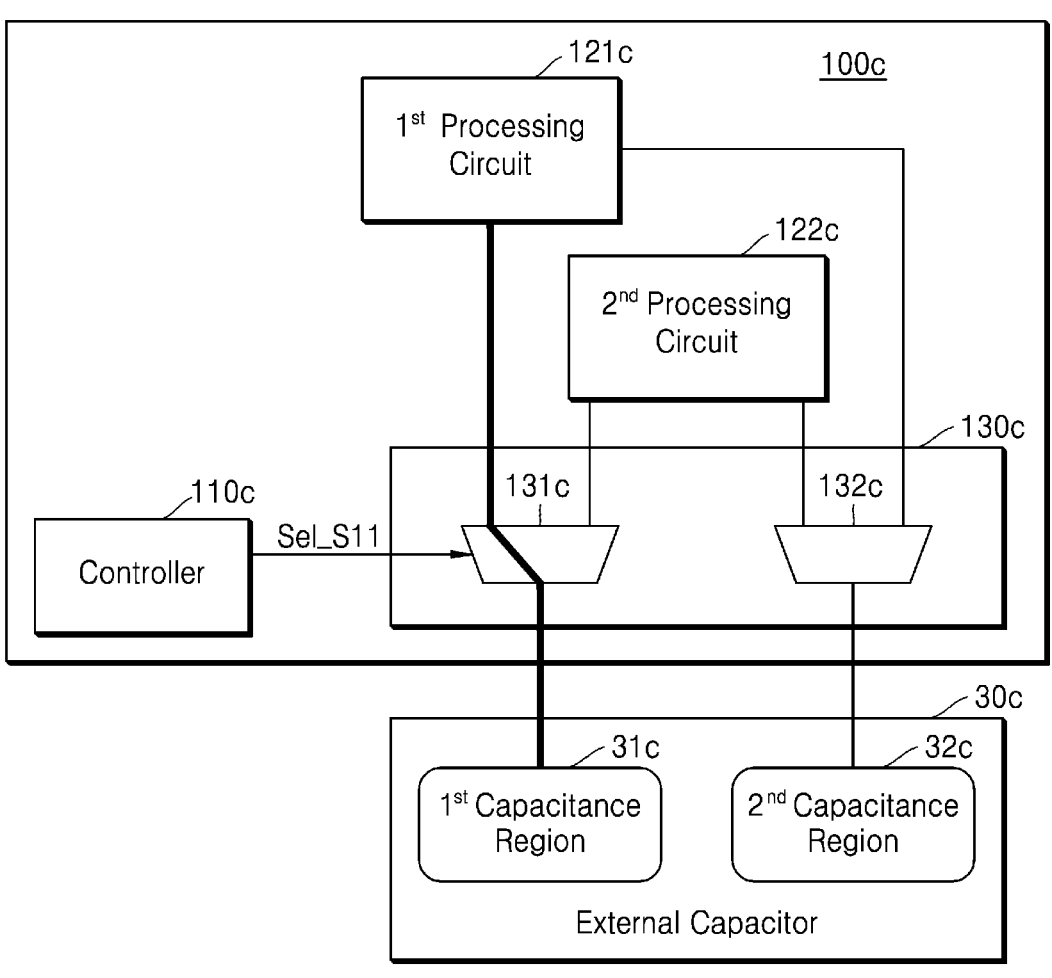
FIGS. 13A and 13B are block diagrams illustrating connection relationships between a first processing circuit and an external capacitor in FIG. 8A.
Figure 13B:
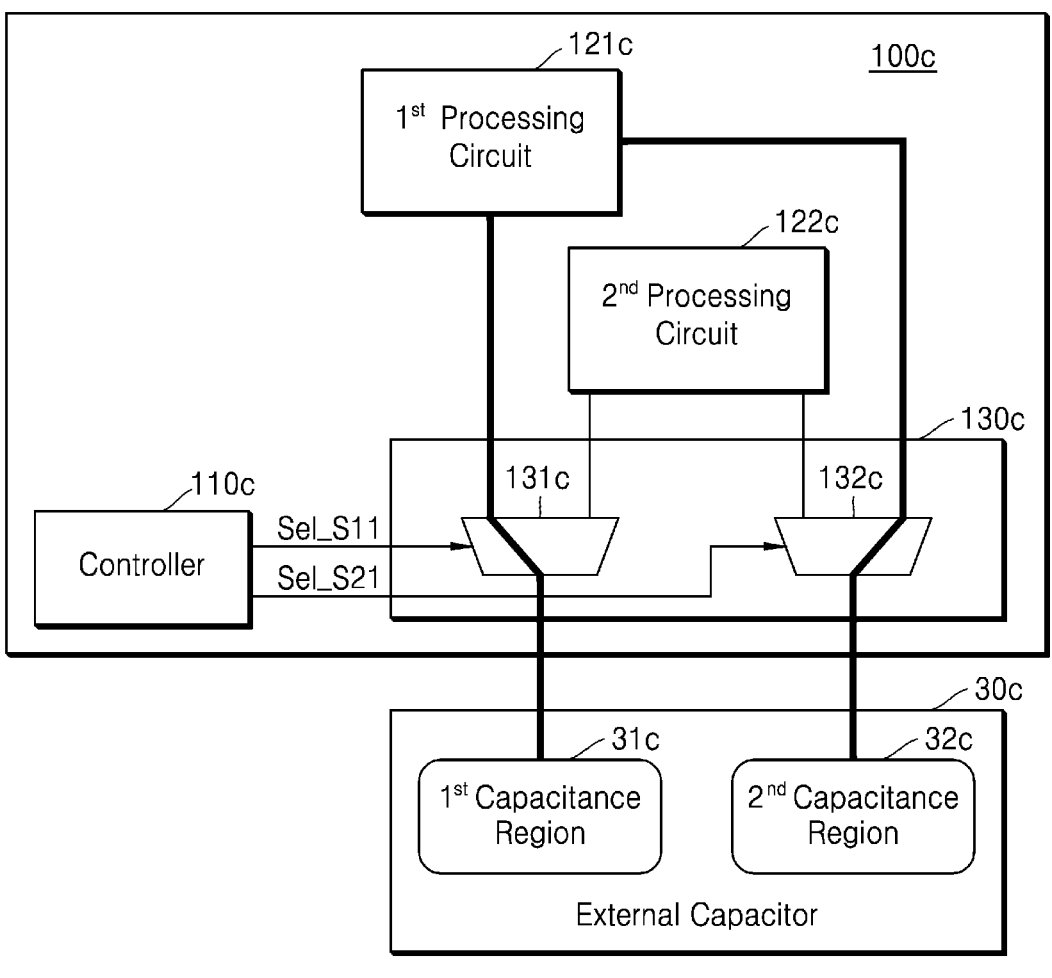

FIG. 11 is a flowchart illustrating a method of operating a system on chip according to an example embodiment, FIG. 12 is a timing diagram illustrating an operation of the system on chip to which the embodiment of FIG. 11 is applied, and FIGS. 13A and 13B are block diagrams illustrating a connection relationship between the first processing circuit 121*d* and the external capacitor 30*c* in FIG. 12.

Referring to FIG. 11, in step S400, the system on chip may perform a CL-DVFS update for the first processing circuit. The CL-DVFS update may include an operation of periodically changing or maintaining a level of a supply voltage or a frequency of a clock signal provided to the first processing circuit. In step S410, the system on chip may control a connection circuit to conform to the CL-DVFS update and provide the first processing circuit with a capacitance from the external capacitor.

Referring further to FIG. 12, the system on chip may perform a connection control operation together with a periodic CL-DVFS update operation at first to third times t1 to t3. In one example, the system on chip reduces a level of an external supply voltage V$_{EX}$ provided to the first processing circuit at the first time t1 from a first level to a second level, and at the same time, may control a connection relationship between the first processing circuit and the external capacitor. In one example, a droop of an internal supply voltage V$_{INT}$ of the first processing circuit does not occur during a period between the first time t1 and the second time t2, and thus, in consideration of this, the system on chip may not connect the external capacitor to the first processing circuit at the first time t1. In another example, referring further to FIG. 13A, the system on chip 100*c* may provide the first selection signal Sel_S11 to the first multiplexer 131*c* at the first time t1 to connect the first capacitance region 31*c* of the external capacitor 30*c* to the first processing circuit 121*c*.

The system on chip may reduce the level of the external supply voltage V$_{EX}$ provided to the first processing circuit from the second level to a third level at the second time t2, and at the same time, may control the connection relationship between the first processing circuit and the external capacitor. In one example, a droop occurs in which the internal supply voltage V$_{INT}$ of the first processing circuit drops below a threshold during a period between the second time t2 and the third time t3, and thus, in consideration of this, the system on chip may mitigate the droop by connecting the external capacitor to the first processing circuit. The external capacitor charges to the present value of the internal supply voltage V$_{INT}$. When a sudden increase in current consumption occurs, the external capacitor supplies a partial portion of the current consumption. Because the current required from the voltage supply has been made less by the partial portion of the current consumption, the droop will be less. In another example, referring further to FIG. 13B, the system on chip 100*c* may provide the first selection signal Sel_S11 to the first multiplexer 131*c* at the second time t2 and provide the second selection signal Sel_S21 to the second multiplexer 132*c*, and thus, the first capacitance region 31*c* and the second capacitance region 32*c* of the external capacitor 30*c* may be connected to the first processing circuit 121*c*. That is, the first processing circuit 121*c* in FIG. 13B may be provided with a larger capacitance than the first processing circuit 121*c* in FIG. 13A.

The system on chip increases the level of the external supply voltage V$_{EX}$ provided to the first processing circuit at the third time t3 from the third level to the first level, and at the same time, may control the connection relationship between the first processing circuit and the external capacitor. A droop of the internal supply voltage VINT of the first processing circuit does not occur during a period after the third time t3, and thus, in consideration of this, the system on chip may not connect the external capacitor to the first processing circuit at the third time t3. In another example, referring further to FIG. 13A, the system on chip 100*c* may provide the first selection signal Sel_S11 to the first multiplexer 131*c* at the third time t3 to connect the first capacitance region 31*c* of the external capacitor 30*c* to the first processing circuit 121*c*.

The example illustrated in FIG. 12 is merely an example embodiment, and the embodiments are not limited thereto, and the system on chip may control a connection relationship between a processing circuit and an external capacitor based on various schemes to mitigate a droop likely to occur due to a change in a level of a supply voltage of the processing circuit or a frequency of a clock signal according to a CL-DVFS operation.

Figure 14:
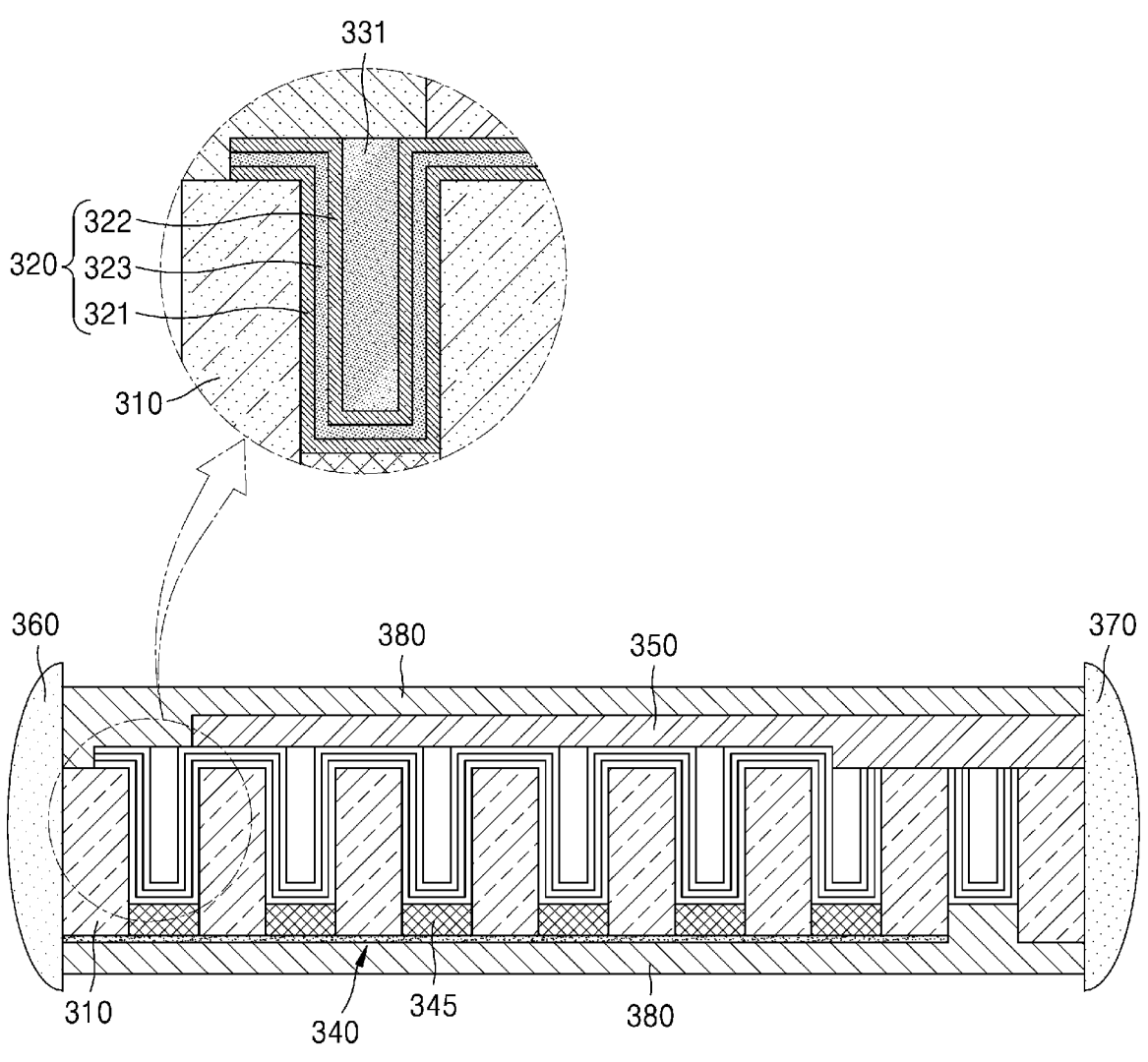
FIG. 14 is a view illustrating an implementation example of an external capacitor according to an example embodiment.

FIG. 14 is a view illustrating an implementation example of an external capacitor according to an example embodiment.

Referring to FIG. 14, an external capacitor is a silicon capacitor and may include a structure 310, a capacitor layer 320, and first connection layer 340 and a second connection layer 350. In addition, the external capacitor 300 may further include a first terminal 360 and a second terminal 370.

Although a shape of the structure 310 is not limited in particular, the structure 310 may have a hexahedral shape in general. The structure 310 may include a plurality of openings penetrating between one surface of a substrate and the other surface thereof. The capacitor layer 320 may be arranged on a lower surface of the structure 310 and in the plurality of openings.

The capacitor layer 320 may include a first electrode 321, a dielectric layer 323, and a second electrode 322. The first electrode 321, the dielectric layer 323, and the second electrode 322 are sequentially stacked, and thus, the dielectric layer 323 may be arranged between the first electrode 321 and the second electrode 322.

The first electrode 321, the dielectric layer 323, and second electrode 322 may be formed through an atomic layer deposition (ALD) process or an atomic vapor deposition (AVD) process, and the embodiments are not limited thereto.

The first electrode 321 and the second electrode 322 may face each other with the first dielectric layer 323 therebetween and serve as a capacitor when voltages of different polarities are respectively applied to the first electrode 321 and the second electrode 322. That is, the capacitor layer 320 may have a metal-insulator-metal (MIM) structure because the first electrode 321 and the second electrode 322 are arranged with the first dielectric layer 323 therebetween. In addition, as described with reference to FIG. 14, the capacitor layer 320 may be divided into a plurality of capacitance regions, and the plurality of capacitance regions may have the same capacitance or different capacitances. Each capacitance region of the plurality of capacitance regions may be connected to a circuit by a terminal of the silicon capacitor. In addition, a common terminal of the silicon capacitor may be connected to a ground.

A charging portion 331 may be arranged on the capacitor layer 320 in the opening of the structure 310. In one example, the charging portion 331 may fill a space remaining after the capacitor layer 320 is arranged in the opening of the structure 310.

The first connection layer 340 may be arranged on a first surface of the structure 310. The first connection layer 340 may be arranged on a second surface of the structure 310. The first electrode 321 of the capacitor layer 320 may be exposed under the opening of the structure 310, and the first connection layer 340 may be connected to the first electrode 321.

Here, a metal layer 345 may be between the first connection layer 340 and the first electrode 321. The metal layer 345 may be formed through an electroplating process using the first connection layer 340 as a seed layer after the first connection layer 340 is formed. In addition, when the first electrode 321 is deposited inside the opening, the first electrode 321 may also be deposited on the metal layer 345.

The second connection layer 350 may be arranged on the second surface of the structure 310. Specifically, the second layer 350 may be arranged on the second surface of the structure 310 to cover the capacitor layer 320 and may be in contact with the second electrode 322 to be connected to the second electrode 322 arranged on the uppermost surface of the capacitor layer 320. The second connection layer 350 may be arranged on the second surface of the structure 310.

In addition, an insulating layer may be arranged in a region on a second side. The insulating layer may be arranged in the region on the second side to insulate between the second connection layer 350, the first electrode 321, and the dielectric layer 323 such that the second connection layer 350 in contact with the second electrode 322 is not connected to the first electrode 321 and the dielectric layer 323.

Hereinafter, the structure 310 in which the capacitor layer 320, the first connection layer 340, and the second connection layer 350 are arranged is referred to as a body.

The external capacitor 300 may include a protective layer 380. The protective layer 380 may be arranged to surround the body except for sides where the first terminal 360 and the second terminal 370 are arranged. The protective layer 380 may be formed of a polymer material, that is, a polymer resin such as epoxy but is not limited thereto. The protective layer 380 may have a function of protecting the external capacitor 300 from external shocks or conductive foreign materials.

In the external capacitor 300, a porous structure that may be formed of anodic aluminum oxide (AAO) may be used, and after depositing a capacitor layer of a MIM structure, electrodes of the capacitor layer 320 may be respectively connected to terminals on both sides. Because the capacitor layer is formed in the plurality of openings, an area of the MIM structure is increased, and thus, the capacity of a capacitor may be increased. In addition, because the terminals are arranged in a lateral direction of the external capacitor 300, the external capacitor 300 may be implemented to have a low equivalent series inductance (ESL).

In addition, because the external capacitor 300 has a single-layer structure with a high capacity, the external capacitor 300 may be used as a land side capacitor in a semiconductor package including a system on chip requiring a thin thickness.

Figure 15A:
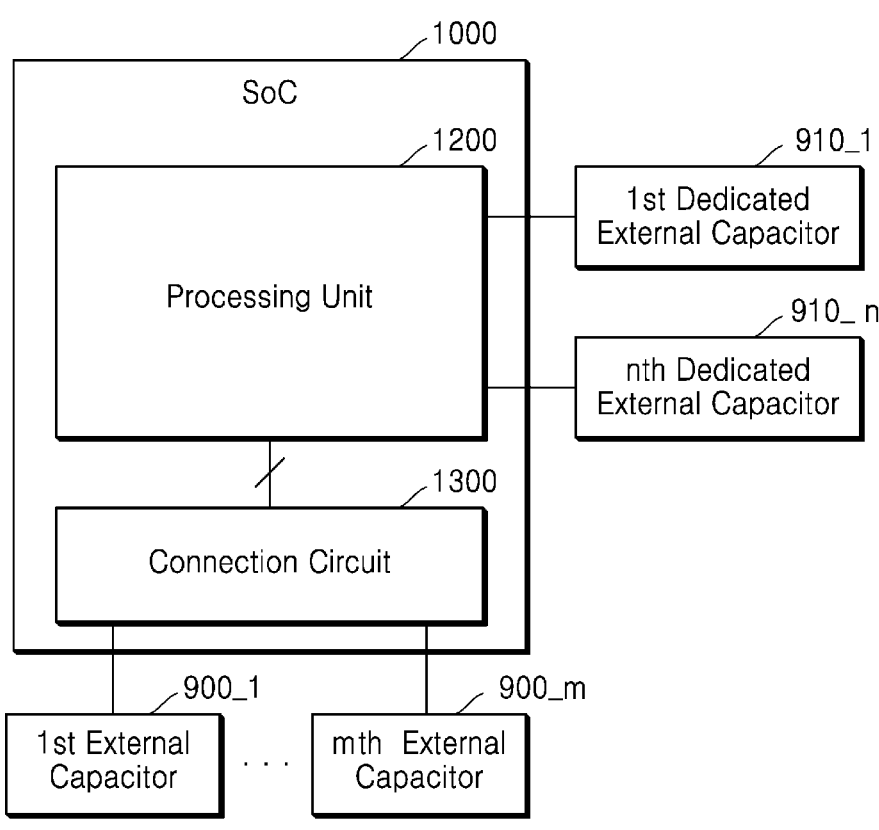
FIGS. 15A and 15B are block diagrams illustrating system on chips according to example embodiments.
Figure 15B:
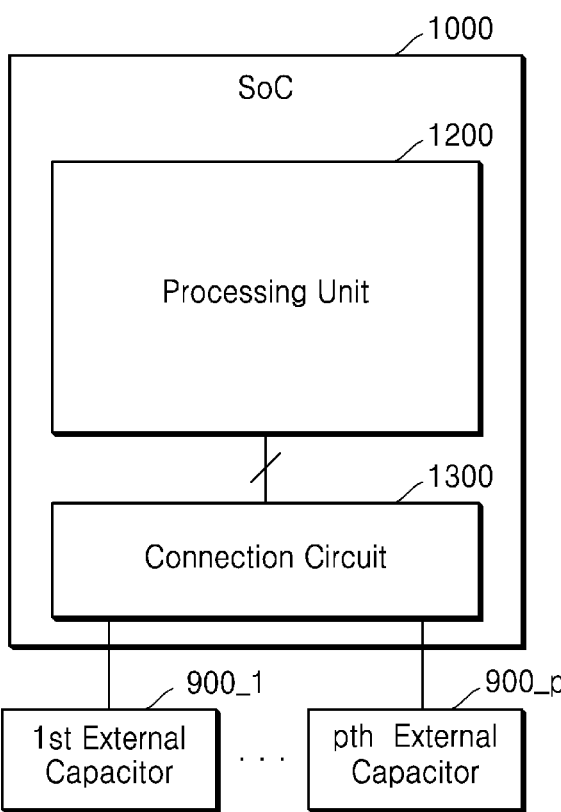

FIGS. 15A and 15B are block diagrams illustrating a system on chip 1000 according to an example embodiment.

Referring to FIG. 15A, the system on chip 1000 may include a processing unit 1200 and a connection circuit 1300. In an example embodiment, the processing unit 1200 may include a plurality of processing circuits, and the processing circuits may be respectively connected to first to $n^{th}$ dedicated external capacitors 910_1 to 910_n. In an example embodiment, the connection circuit 1300 may be connected to first to $m^{th}$ external capacitors 900_1 to 900_m. The plurality of processing circuits may be connected to the first to $m^{th}$ external capacitors 900_1 to 900_m through the connection circuit 1300.

In an example embodiment, the plurality of processing circuits may perform a data processing operation or may be provided with an additional capacitance for mitigating a droop from the first to $m^{th}$ external capacitors 900_1 to 900_m when the droop of a supply voltage occurs due to a CL-DVFS operation. The connection circuit 1300 may perform a connection operation to provide a suitable capacitance to the plurality of processing circuits.

Referring further to FIG. 15B, the first to $n^{th}$ dedicated external capacitors 910_1 to 910_n of FIG. 15A may be replaced with first to $p^{th}$ external capacitors 900_1 to 900_p. The connection circuit 1300 may adaptively perform a connection operation between the first to $p^{th}$ external capacitors 900_1 to 900_p and the plurality of processing circuits when a capacitance is required while the plurality of processing circuits perform operations.

While example embodiments have been particularly shown and described, it will be understood that various changes in form and details may be made therein without departing from the spirit and scope of the following claims.

What is claimed is:

1. A system on chip comprising:
    a processing unit including a first processing circuit to which a first supply voltage is applied and a second processing circuit to which a second supply voltage is applied;

a connection circuit configured to form a path connecting one of the first processing circuit and the second processing circuit to an external capacitor; and a controller configured to:

monitor a first state of the first processing circuit and a second state of the second processing circuit, wherein the first state is associated with a droop in the first supply voltage and the second state is associated with a droop in the second supply voltage, compare a first droop degree of the first processing circuit with a second droop degree of the second processing circuit, and control the connection circuit based on a result of the comparison, wherein the first supply voltage and the second supply voltage are controlled by a closed loop dynamic voltage frequency scaling (CL-DVFS), and wherein the connection circuit is further configured to, in response to a control signal from the controller, connect the external capacitor to at least one of the first processing circuit and the second processing circuit based on a comparison of an occurrence of a droop in the first supply voltage and the second supply voltage respectively applied to the first processing circuit and the second processing circuit.

2. The system on chip of claim 1, wherein the first processing circuit and the second processing circuit are further configured to be respectively connected to a first dedicated external capacitor and a second dedicated external capacitor.

3. The system on chip of claim 2, wherein the external capacitor is configured to provide an additional capacitance to the at least one of the first processing circuit and the second processing circuit.

4. The system on chip of claim 1, wherein the connection circuit is further configured to, in response to the control signal from the controller, connect the external capacitor to a processing circuit with a greater level of a droop, from among the first processing circuit and the second processing circuit, or a processing circuit with a greater frequency of occurrence of a droop, from among the first processing circuit and the second processing circuit.

5. The system on chip of claim 1, wherein the connection circuit is further configured to, in response to a second control signal from the controller, connect a processing circuit with a higher level of load, from among the first processing circuit and the second processing circuit, to the external capacitor.

6. The system on chip of claim 1, wherein the external capacitor includes a first capacitance region and a second capacitance region, and the connection circuit is further configured to:

form a first path connecting one of the first processing circuit and the second processing circuit to the first capacitance region, and form a second path connecting one of the first processing circuit and the second processing circuit to the second capacitance region.

7. The system on chip of claim 1, wherein the external capacitor includes a first capacitance region, and a second capacitance region exclusively connected to the first processing circuit, and the connection circuit is further configured to form the path connecting one of the first processing circuit and the second processing circuit to the first capacitance region.

8. The system on chip of claim 1, wherein the external capacitor comprises:

a capacitor layer including a dielectric layer, and a first electrode and a second electrode having the dielectric layer therebetween;

a first connection layer connected to the first electrode; and a second connection layer connected to the second electrode.

9. The system on chip of claim 1, wherein the controller is further configured to control a selective connection between one of the first processing circuit and the second processing circuit and the external capacitor at a CL-DVFS update time of one of the first processing circuit and the second processing circuit.

10. An electronic system comprising:

a system on chip including a plurality of processing circuits, each processing circuit being provided with a respective supply voltage;

a plurality of dedicated capacitors respectively assigned to the plurality of processing circuits;

a sharing capacitor shared with at least two processing circuits of the plurality of processing circuits, wherein the system on chip comprises:

a connection circuit configured to form a path connecting the at least two processing circuits to the sharing capacitor; and a controller configured to:

monitor a respective state of each processing circuit of the plurality of processing circuits, wherein a first state of a first processing circuit of the plurality of processing circuits is associated with a droop in a first supply voltage of the first processing circuit and a second state of a second processing circuit of the plurality of processing circuits is associated with a droop in a second supply voltage of the second processing circuit, compare a first droop degree of the first processing circuit with a second droop degree of the second processing circuit, and control the connection circuit based on a result of the monitoring comparison, wherein the respective supply voltages are controlled by a closed loop dynamic voltage frequency scaling (CL-DVFS), and wherein the connection circuit is further configured to, in response to a control signal from the controller, connect an external capacitor to at least one of the first processing circuit and the second processing circuit based on a comparison of an occurrence of a droop in the first supply voltage and the second supply voltage respectively applied to the first processing circuit and the second processing circuit.

11. The electronic system of claim 10, wherein the connection circuit is further configured to connect the sharing capacitor to either one of the at least two processing circuits.

12. The electronic system of claim 10, wherein the sharing capacitor includes a plurality of capacitance regions, and the connection circuit is further configured to connect all or some of the plurality of capacitance regions to one of the at least two processing circuits.

13. A system on chip comprising:

a processing unit including a first processing circuit to which a first external dedicated capacitor is connected and to which a first supply voltage is applied, and a second processing circuit to which a second external dedicated capacitor is connected and to which a second supply voltage is applied;

a connection circuit configured to form a path providing an additional capacitance from an external capacitor to at least one of the first processing circuit and the second processing circuit; and a controller configured to:

monitor a first state of the first processing circuit and a second state of the second processing circuit, wherein the first state is associated with a first droop in the first supply voltage and the second state is associated with a second droop in the second supply voltage, compare a first droop degree of the first processing circuit with a second droop degree of the second processing circuit, and control the connection circuit based on a result of the comparison, wherein the first supply voltage and the second supply voltage are controlled by a closed loop dynamic voltage frequency scaling (CL-DVFS), and wherein the connection circuit is further configured to, in response to a control signal from the controller, connect the external capacitor to at least one of the first processing circuit and the second processing circuit based on a comparison of an occurrence of a droop in the first supply voltage and the second supply voltage respectively applied to the first processing circuit and the second processing circuit.

14. The system on chip of claim 13, wherein the connection circuit is further configured to, in response to a second control signal from the controller, provide the at least one of the first processing circuit and the second processing circuit with the additional capacitance having various values from the external capacitor.

* * * * *